(No Model.)
O. UNZ & R. G. HENDRIE.
TOY.
No. 262,517. Patented Aug. 8, 1882.
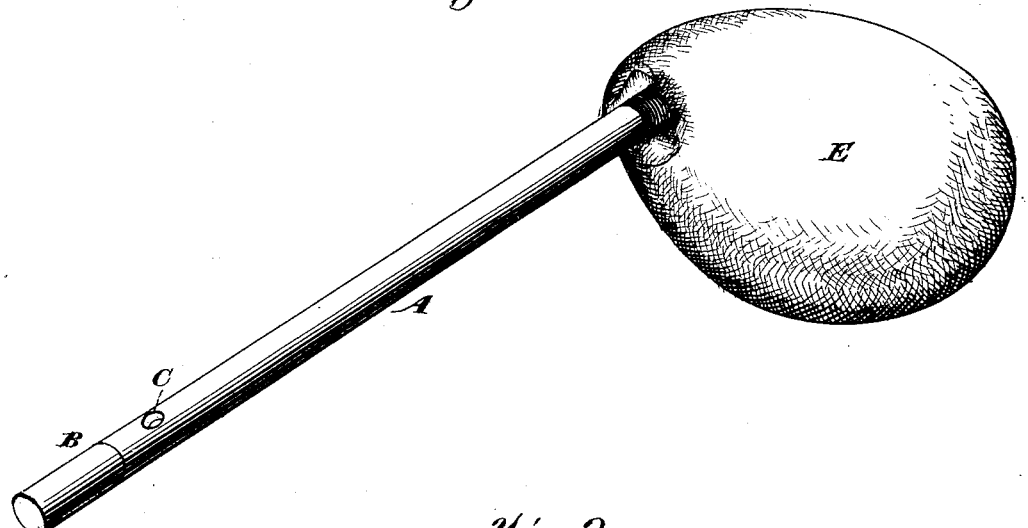
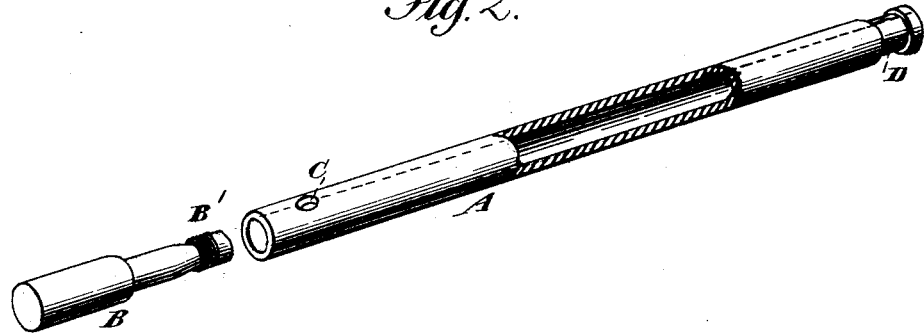
Witnesses.
A. Ruppert.
Wm. H. Bates.
O. Unz
R. G. Hendrie
Inventors.
Holloway & Blanchard
Attys

UNITED STATES PATENT OFFICE.

OSCAR UNZ AND ROBERT G. HENDRIE, OF NEW YORK, N. Y.

TOY.

SPECIFICATION forming part of Letters Patent No. 262,517, dated August 8, 1882.

Application filed June 16, 1882. (No model.)

*To all whom it may concern:*

Be it known that we, OSCAR UNZ and ROBERT G. HENDRIE, citizens of the United States, residing at the city of New York, in the county of New York and State of New York, have invented certain new and useful Improvements in Toys, of which the following is a specification, reference being had therein to the accompanying drawings.

Our invention relates to toys for the amusement of children; and the objects of our improvements are to provide a novel device for that purpose, which we denominate a "doodlie bang," consisting of a hollow handle, through which air may be forced into a bladder or other elastic sack attached to the end thereof, said handle being provided with a stopper for retaining the air in the sack. We attain these objects by the devices illustrated in the accompanying drawings, in which—

Figure 1 is a perspective view of our improved device, showing the hollow handle with a stopper in its end and an aperture through which air is forced; and Fig. 2 is a perspective view of the handle and its stopper, showing the packing thereon and an aperture through which air is forced into the sack.

Similar letters refer to similar parts in both the views.

In constructing toys of this type we provide a hollow or tubular handle, A, of any desired length and diameter, one end of which is provided with a stopper, B, a portion of which is reduced in diameter to such an extent as to allow it to enter the aperture in the handle, and that portion which enters said handle is further reduced for the purpose of adapting it for the reception of some elastic substance B', which serves as a packing for preventing the escape of air around the stopper. Near that end of the handle into which the stopper is inserted there is formed an aperture, C, through which air is forced by the lungs of the operator or in any other manner, the stopper at such times being drawn outward in the handle, so as to cause the packing to be outside of or beyond said aperture, the effect being to cause the entering air to pass through the handle and into a sack attached to its opposite end. Near that end of the handle to which the sack is attached there is formed a nick or reduced portion, D, into which the neck of said sack is forced and fastened by a wire or string wound around it, as shown in Fig. 1.

The sack above alluded to may be of any desired size, and may consist of a bladder or of any other elastic substance that is impervious to air and water—such, for instance, as thin rubber—and it may be colored to suit the taste of the constructor or purchaser.

The sack is designated by the letter E, and it may be of any form desired. In filling the sack with air a convenient method is to withdraw the stopper B far enough to cause the packing to be outward from the aperture C in the handle, and then apply the lips to said aperture and blow air in until the sack is fully distended, when the stopper is to be suddenly pushed inward to the position shown in Fig. 1, at which time this device is in condition for use. Instead of using the stopper as a valve for retaining the air in the sack, a valve opening inward may be placed in the end of the handle and kept closed by a spring, which will automatically close after the sack has been filled with air.

We are aware that in a book, entitled "Gulliver's Travels," in chapter two, there is described a device consisting of a bladder secured to the end of a stick, but no mention is made of any means of supplying air to the bladder or of any hollow handle and valve.

Having thus described our invention, what we claim, and desire to secure by Letters Patent, is—

The combination, in a toy for children, of the tubular or hollow handle A, through which air is forced, the stopper B, placed in one end of said handle for retaining the air that has been forced into it, the aperture C, through which the air is forced, and the bladder or sack E, the parts being constructed and arranged, substantially as set forth and for the purpose specified.

In testimony whereof we affix our signatures in presence of two witnesses.

OSCAR UNZ.
ROBERT G. HENDRIE.

Witnesses:
HENRY C. KUNKEL,
J. F. APGAR.